UNITED STATES PATENT OFFICE.

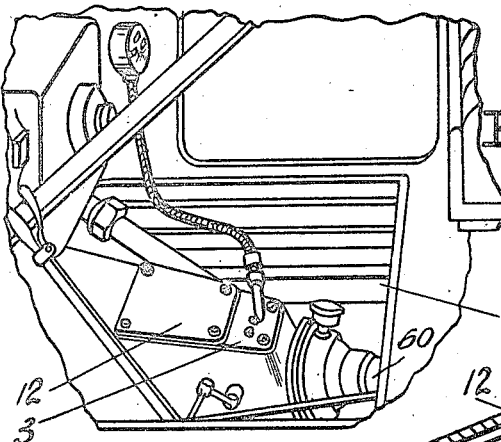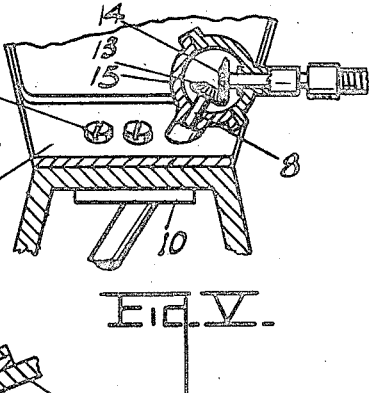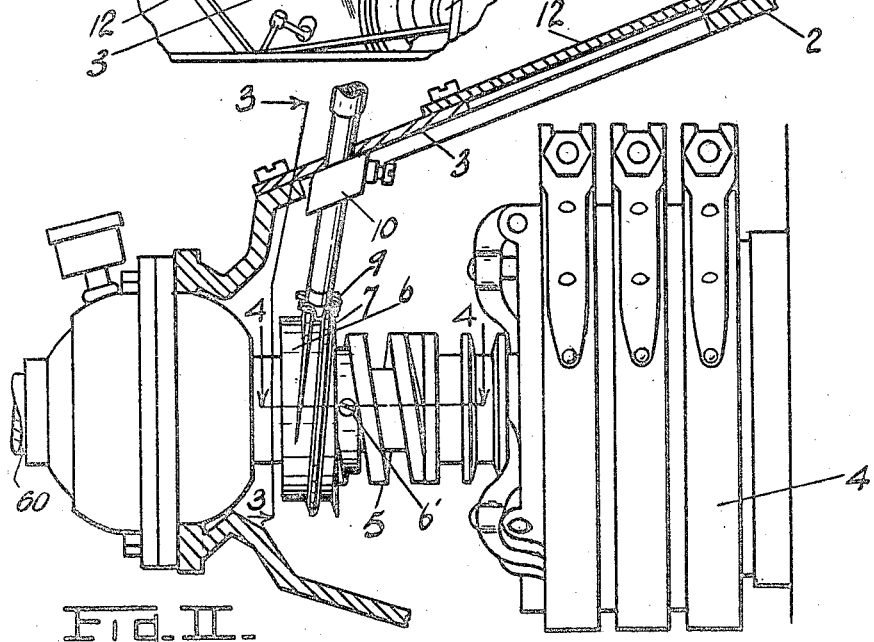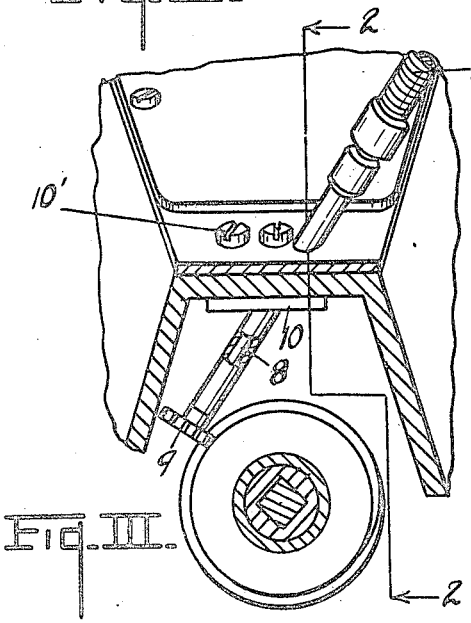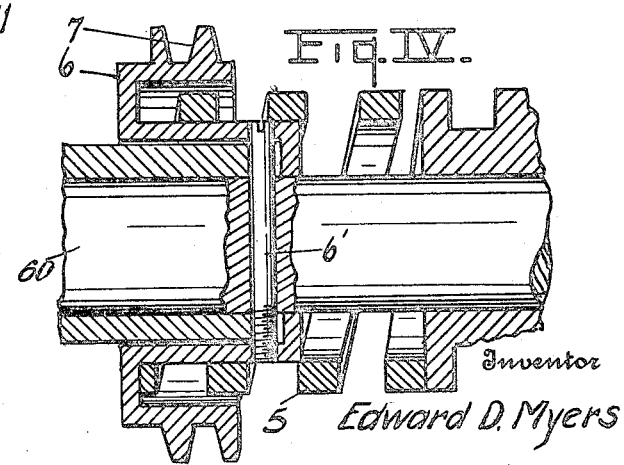

EDWARD D. MYERS, OF SHELBY, MICHIGAN.

SPEEDOMETER DRIVING GEAR.

1,420,054.            Specification of Letters Patent.  Patented June 20, 1922.

Application filed August 11, 1921. Serial No. 491,594.

*To all whom it may concern:*

Be it known that I, EDWARD D. MYERS, a citizen of the United States, residing at Shelby, Oceana County, Michigan, have invented certain new and useful Improvements in Speedometer Driving Gears, of which the following is a specification.

This invention relates to an improved driving gear for speedometers especially adapted to Ford automobiles.

The object of the invention is to provide a simple and effective drive for speedometer shaft to be driven from the driving gear of a Ford automobile.

Objects pertaining to details and economies of construction and operation will appear from the detailed description to follow. The invention is defined and pointed out in the claims.

A structure which is a preferred embodiment of my invention is clearly illustrated in the accompanying drawing, forming a part of this application, in which:

Fig. I is a detail perspective view of portions of a Ford automobile with the floor boards removed, showing my improved speedometer driving means in place.

Fig. II is an enlarged detail vertical longitudinal section of the transmission of a Ford automobile, portions being shown in full lines and the parts of my speedometer drive being shown in full lines, taken on line 2—2 of Fig. III.

Fig. III is a similar enlarged detail transverse sectional view taken on line 3—3 of Fig. II.

Fig. IV is an enlarged detail longitudinal sectional view through the modified clutch spring support with extension and worm and spring of a Ford automobile, taken on line 4—4 of Fig. II.

Fig. V is a detail sectional view of an addition and modification of the structure.

In the drawing the sectional views are taken looking in the direction of the little arrows at the ends of the section lines and similar numerals of reference refer to similar parts throughout the several views.

Considering the numbered parts of the drawing, 1 is the engine of an automobile. 2 is the transmission casing. 3 is the usual transmission case cover door. 4 is the planetary transmission. 5 is the clutch spring, 6 is the modified clutch spring support bearing the worm 7. This worm is formed on a cylindrical part embracing said spring. 60 is the propeller shaft. 8 is the shaft of the speedometer provided with worm gear 9 engaged by the said worm 7 (see Figs. II and III). The shaft 8 is carried in the box 10 secured to the cover door by suitable cap screws 10'. The usual flexible shaft 11 is connected to the shaft 8 and drives the speedometer. 12 is a separable detachable cover door carried by the cover door 3 of the transmission, and is the part that is ordinarily removable when my improved speedometer drive means is in position.

From this description it will be readily seen that my improved speedometer drive is installed in a Ford automobile by removing the clutch spring support and substituting therefor a modified clutch spring support built integral with extended portion with worm 7 thereon. This has a hub part which closely fits the propeller shaft 60 to which it is rigidly secured by pin 6'. I then provide a substitute cover door for the cover door already on the transmission case, to which is secured the driven shaft of my speedometer drive. This is of such form and so arranged that the worm gear 9 meshes with the worm 7. My improved cover door has an auxiliary cover 12 which permits free access to the transmission for adjustment without removing the speedometer gear.

In Fig. V I show a bevel gear connection to the upper end of the shaft 8 comprising bevel gears 13 14 suitably meshed together and encased with the casing 15. The speedometer shaft can then be disposed at any desired angle without unduly bending the flexible shaft.

I have illustrated my invention especially applied to Ford automobiles but it can of course be made use of upon similar types, and I desire to claim the same in this specific relation and also to claim the invention in general terms, as pointed out in the appended claims.

Having thus described my invention, what I claim as new and desire to secure by Letters Patent is:

1. In a speedometer drive, the combination of the transmission with propeller shaft in a suitable casing, a clutch spring support provided with an extension bearing a suitable worm with the hub rigidly secured to the propeller shaft, a cover door for the transmission case with a bearing boxing thereon, and a speedometer shaft disposed obliquely therein, with bevel gear at its upper end, and a worm gear on the said shaft engaged by the said worm, coacting as specified.

2. In a speedometer drive, the combination of the transmission with propeller shaft in a suitable casing, a clutch spring support provided with an extension bearing a suitable worm with the hub rigidly secured to the propeller shaft, a cover door for the transmission case with a bearing boxing thereon, and a speedometer shaft disposed obliquely therein, and a worm gear on the said shaft engaged by the said worm, coacting as specified.

3. In a speedometer drive, the combination of the transmission with propeller shaft in a suitable casing, a clutch spring support provided with suitable worm with the hub rigidly secured to the propeller shaft, a cover door for the transmission case with a bearing boxing thereon, and a speedometer shaft disposed obliquely therein, and a worm gear on the said shaft engaged by the said worm, coacting as specified.

In witness whereof I have hereunto set my hand and seal in the presence of two witnesses.

EDWARD D. MYERS. [L. S.]

Witnesses:
MABEL W. MURPHY,
LETTIE B. BENNETT.